July 27, 1926.
J. T. PLESS
1,594,298
POSITION INDICATOR FOR AUTOMOBILES
Filed August 26, 1925
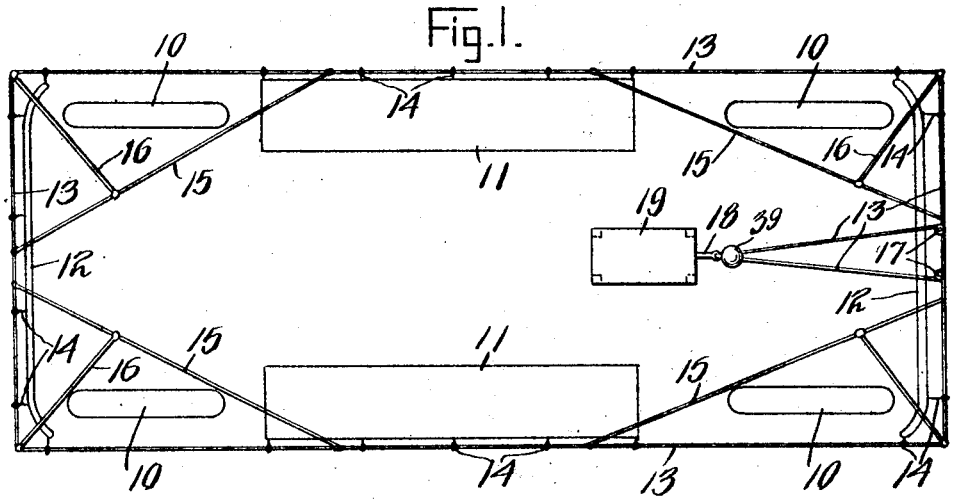
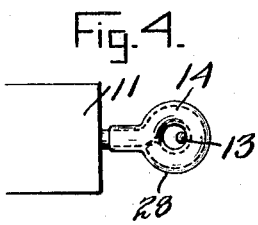
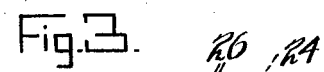
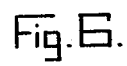
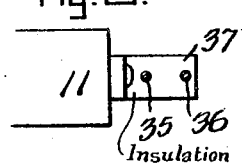
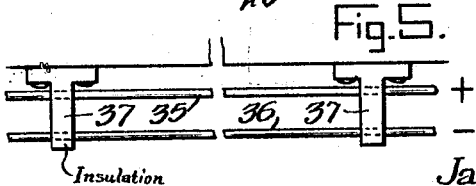
Inventor
James T. Pless
Attorney

Patented July 27, 1926.

1,594,298

UNITED STATES PATENT OFFICE.

JAMES T. PLESS, OF LANCASTER COUNTY, PENNSYLVANIA.

POSITION INDICATOR FOR AUTOMOBILES.

Application filed August 26, 1925. Serial No. 52,653.

My said invention relates to indicating devices for use in connection with automobiles and it is an object of the device to indicate the exact location of an automobile at the time of a collision, this being often a matter of importance in determining who was at fault and who is liable for damages. My device makes a sufficiently permanent indication for all practical purposes and this will be made regardless of whether the car provided with the indicator was moving or was stationary and was struck by a moving car.

Referring to the accompanying drawings which are made a part hereof and on which similar reference characters indicate similar parts:—

Figure 1 is a plan of my device in position on the running gear of a car,

Figure 2, a side view thereof in elevation,

Figure 3, a top plan thereof with parts broken away to show other parts in detail, and Figures 4, 5 and 6 are details of features that may be used if desired.

In the drawings reference character 10 indicates the wheels of an automobile having running boards 11 and bumpers 12. A wire 13 encircles the car, said wire being supported by suitable brackets 14 on the bumpers and the running boards. Wires 15 extend diagonally of the four corners of the rectangle formed by the main wire and these wires 15 are secured at each end to the main wire. The rods 16 are connected at one end to an intermediate point on the wires 15 and at the other end to the wire 13 at the corners of such a rectangle.

The main wire 13 extends about pulleys 17 at the front end of the car and back to the draw-bar 18, the strands overlapping between said pulleys. The draw-bar extends into a casing or frame 19 of any convenient form which may be secured to the underside of the automobile body or to the running gear in any convenient manner. A leaf spring 20 is fixed at one end to the bottom member of the casing and at the other end is held up by a detent 21 pivotally connected to the draw-bar 18. A spring 22 holds the detent normally in the position indicated in Fig. 2, the detent being pivoted at 23 to the top of the casing.

The bottom of the casing has an opening of rounded form, or approximately hemispherical, in which is held a hollow spherical container 24 of rubber or other suitable material. This container is held down and covered by a piece of flexible sheet material 25 secured in place by tacks 26 or in any other convenient manner.

The container 24 which may be a single device in the shape of a hollow ball or other suitable form or which may consist of a plurality of hollow balls or other devices is provided at its under side with an orifice 27 preferably held in a position where it points directly downward. The friction due to the rounded opening in the bottom of the casing and to the cover 26 will hold the container securely in place and preferably this is made of rubber so as to increase the friction and also because the rubber will yield readily to pressure and resume its shape thereafter.

My device, as described above, may be purely mechanical in design and operation. It may also be operated in other ways and electrical means are illustrated which may be combined with the mechanical means or which may be used alone without the mechanical trip illustrated. In case a device is to be operated electrically the eyes 14 will be insulated from the wire 13 by porcelain or other insulating material indicated at 28 in Figure 4. In a preferred form of operating means a conductor 29 may be laid over a part of the wire 13 to a battery 30 from which another conductor 31 leads to an electromagnet 32 which may be grounded on the body at 33. The tail of the detent 21 constitutes an armature for the electromagnet.

In the form above described reliance is had on a contact of the wire 13 with a metallic part of the car to close the circuit to energize the magnet. It is desirable, however, to utilize a construction such as illustrated in Figures 5 and 6 in which a positive conductor 35 and a negative conductor 36 are arranged in parallelism about the body of a car, said conductors extending through brackets 37 of insulating material.

In the operation of my device the parts are positioned as shown in the drawings. Should a collision now occur the wire 13 will be flexed out of its normal shape and this will pull on the draw-bar 18. If the flexing of the wire should occur at one corner of the car a rod 16 will bend the wire 15 and cause it to pull on the wire 13 so that in any case the draw-bar 18 will be pulled lengthwise of itself or in a forward direction as here illustrated. Such action draws detent 21 forward against the action of the spring 22 and releases the leaf spring 20 whereupon this spring will strike the cover 25 strongly and suddenly and will compress the rubber container. The container is preferably filled with fluent material, usually liquid or semi-liquid material of a conspicuous character e. g. a bright color to show up clearly on the roadbed. The action of the spring will cause such liquid or semi-liquid to be discharged forcibly and directly downward on the road so as to leave an unmistakable indication of the location of the car at the precise instant of the collision.

In case the electrical features are added, such as are shown in Figures 2 and 4, the indicating means will be operated by contact of the wire 13 with a metallic part of the car and this w'll operate in conjunction with the mechanical means or independently thereof to release the detent to permit the spring 20 to operate on the container 27. Where positive and negative wires are utilized as in Figures 5 and 6 the necessity of passing the circuit through the body of the vehicle is obviated and contact of one wire with the other serves to operate the device in a manner heretofore described. When the electrical and mechanical controlling means are used in conjunction an insulating device such as is indicated generally at 39 is interposed in the wire 13 or between said wire and the draw-bar 18, as shown in Figures 1 and 2. As above suggested there may be more than one container and they may be of different shapes, furthermore they may contain liquid or other fluent materials having different characteristics in the different containers, i. e. the materials may be of different colors or may be different in other ways according to the needs in particular situations.

It will be obvious to those skilled in the art that various changes may be made in my device without departing from the spirit of my invention and therefore I do not limit myself to what is shown in the drawings and described in the specification but only as indicated in the appended claims.

Having thus fully described my said invention, what I claim as new and desire to secure by Letters Patent, is:—

1. The combination with a vehicle of an indicating device comprising a receptacle for liquid positioned to eject its contents toward the roadbed, collision-operated means for causing the liquid to be ejected including a wire encircling the vehicle, and connections from said wire to said vehicle, substantially as set forth.

2. The combination with a vehicle of an indicating device comprising a collapsible receptacle, adapted to contain material to be ejected upon the roadway, collision-operated means including a device tending to compress said receptacle to eject said material, and means for normally restraining such device from action, substantially as set forth.

3. The combination wth a vehicle of an indicating device comprising a collapsible receptacle, adapted to contain material to be ejected upon the roadway, a leaf spring tending to collapse the receptacle to eject said material, a detent engaging the leaf spring to hold it out of operation, and collision-operated means for releasing the detent, substantially as set forth.

4. The combination with a vehicle of an indicating device comprising a receptacle for liquid positioned to eject its contents toward the road bed, collision-operated means for causing the liquid to be ejected including a wire encircling the vehicle in substantially rectangular form, diagonal wires extending across the corners of the rectangle and secured to said main wire, rods connected to said diagonal wires said rods extending toward the corners of the rectangle, and connections from said main wire to said receptacle, substantially as set forth.

5. The combination with a vehicle of an indicating device comprising a collapsible receptacle, adapted to contain material to be ejected upon the roadway, means tending to compress said receptacle to eject said material, means for normally restraining such device from action, and collision-operated means for releasing said restraining means, substantially as set forth.

6. The combination with a vehicle of an indicating device comprising a collapsible receptacle, adapted to contain material to be ejected upon the roadway, means tending to compress said receptacle to eject said material, means for normally restraining such device from action, and mechanical collision-operated means for releasing said restraining means substantially as set forth.

In witness whereof, I have hereunto set my hand and seal at Washington, District of Columbia, this 22nd day of August, A. D. nineteen hundred and twenty-five.

JAMES T. PLESS. [L. S.]